Aug. 4, 1959 D. L. McFARLAND 2,898,437
COMBINATION ELECTRIC COOKING APPLIANCE
Filed June 6, 1956 2 Sheets-Sheet 1
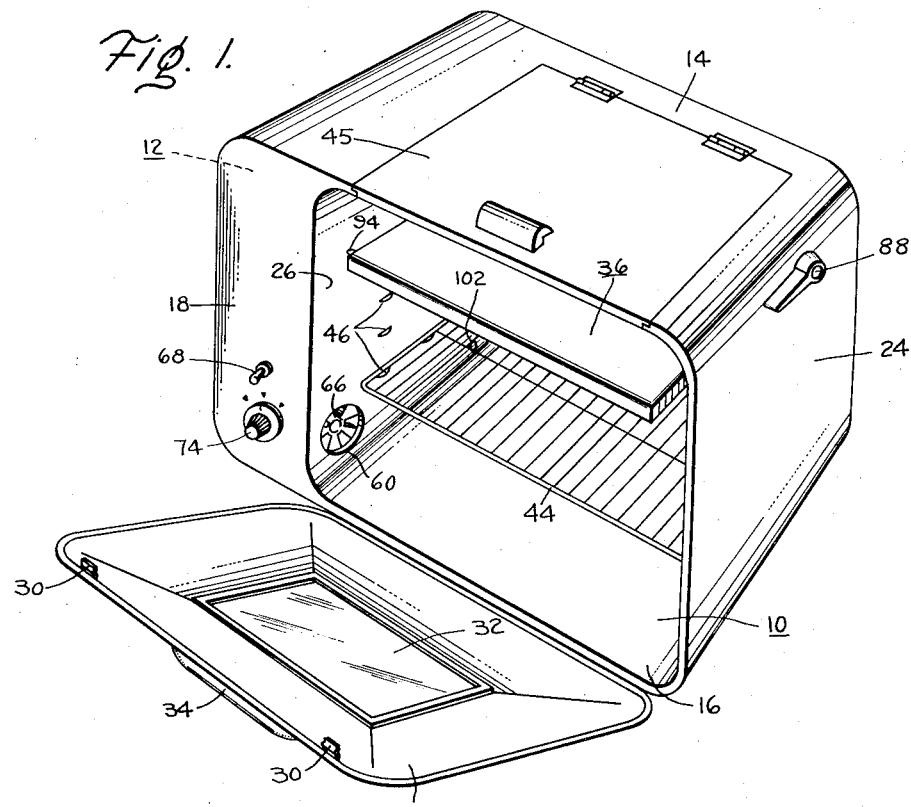
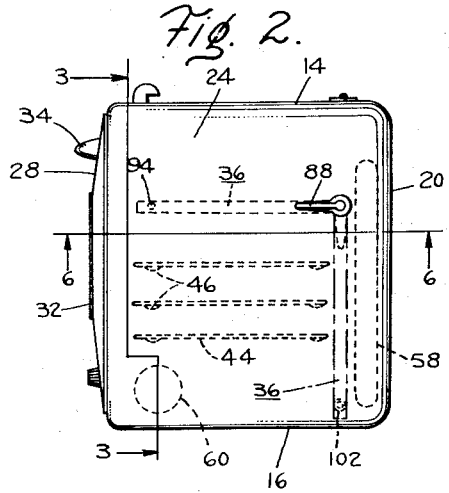
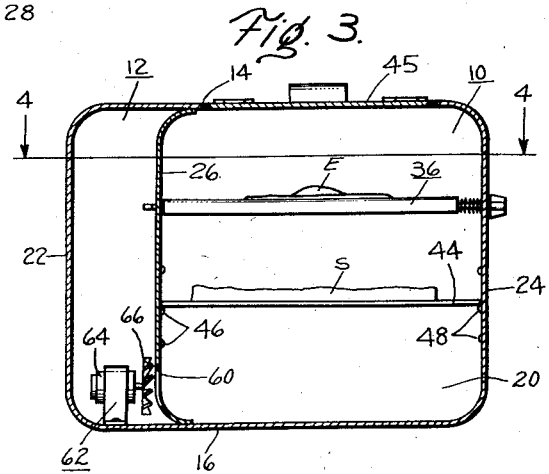
Inventor:
Donald L. McFarland
by Armand Cifelli
His Attorney Aug. 4, 1959   D. L. McFARLAND   2,898,437
COMBINATION ELECTRIC COOKING APPLIANCE
Filed June 6, 1956   2 Sheets-Sheet 2
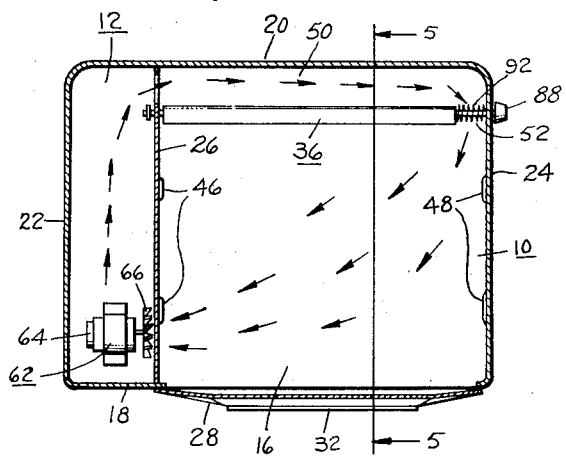
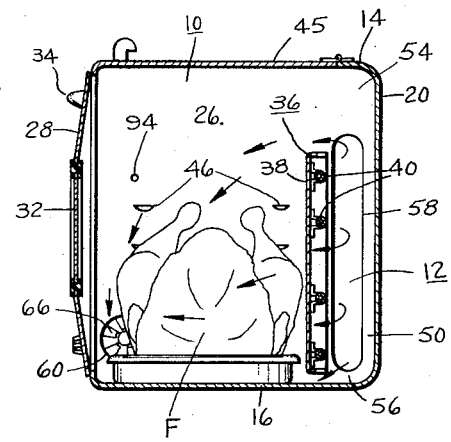
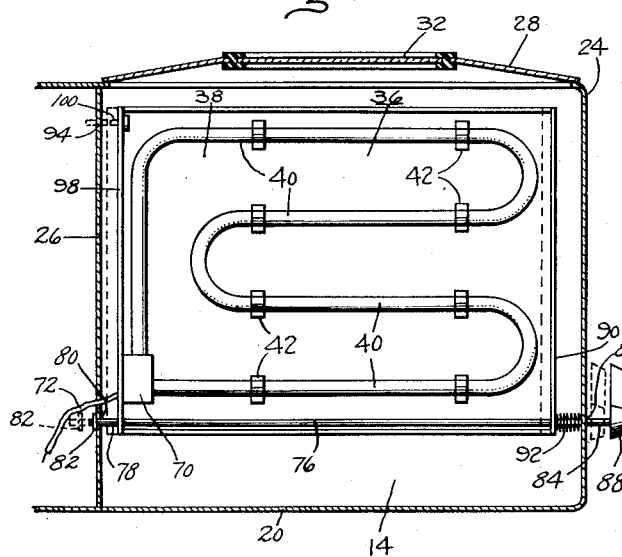
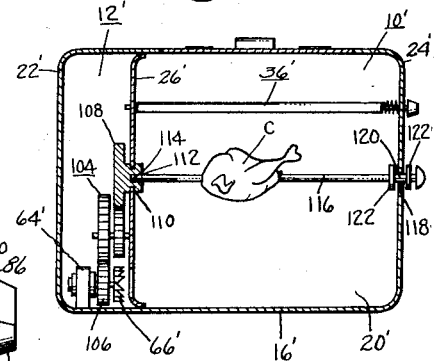
Inventor:
Donald L. McFarland
by Armand Cifelli
His Attorney United States Patent Office 2,898,437
Patented Aug. 4, 1959

2,898,437

COMBINATION ELECTRIC COOKING APPLIANCE

Donald L. McFarland, Nichols, Conn., assignor to General Electric Company, a corporation of New York Application June 6, 1956, Serial No. 589,683

11 Claims. (Cl. 219—35)

This invention relates to combination, electric, cooking appliances and, particularly, those of the type which are capable of performing multiple cooking functions, such as roasting or baking, broiling and grilling.

The usefulness and economy of multi-purpose, combination, cooking appliances have been recognized by the art, and as a result there are many such devices in existence. A problem which has not been satisfactorily treated by the art is that of providing a multi-purpose, combination, cooking appliance which performs each of its separate cooking functions effectively and efficiently. A concomitant problem which the art constantly strives to overcome is that of reducing the cost of manufacturing such combination, cooking appliances.

It is an object of this invention to provide a multi-purpose, combination, electric, cooking appliance which is capable of performing multiple cooking functions, and which is simple in construction, efficient in performing each of its cooking functions, and low in cost.

It is another object of this invention to provide a combination, electric, cooking appliance which is capable of selectively functioning as either a roaster or baker, broiler, grill or rotisserie.

Some of the objects of this invention are achieved in one form by providing a combination, cooking appliance having heating means which is movable so as to assume positions wherein it functions either to roast or bake, or broil or grill the food in the appliance, and wherein means is provided for causing a flow of air through the appliance when the heating means is in position to roast or bake, the heating means, when in said position, forming a part of the passage means for directing the flow of air through the appliance.

Other objects of this invention are achieved in one form by providing a combination, cooking appliance having heating means which is movable to different positions to perform different cooking functions, in association with a means for causing a flow of air through the appliance, the heating means, when in roasting or baking position, and the air flow means cooperating to effect a forced flow of warm air through the appliance, and the air flow means being adapted to provide the motive power for driving a rotisserie spit when the heating means is in broiling position.

Other objects and further details of that which I believe to be novel, and my invention will be clear from the following description and claims taken with the accompanying drawings wherein:

Fig. 1 is a perspective view of the improved, combination, cooking appliance with the oven door shown in open position, and a portion of the interior of the oven exposed showing the appliance set for broiling or grilling;

Fig. 2 is a side elevational view of Fig. 1 appliance showing the oven door closed, the dot-dash lines indicating the roasting or baking position of the heating means;

Fig. 3 is a sectional view taken substantially on line 3—3 of Fig. 2, with the addition of an object of food placed on the broiling rack which is shown disposed in its intermediate position and another object of food placed on the heating means for grilling;

Fig. 4 is a sectional view taken substantially on line 4—4 of Fig. 3 after the broiling rack and food have been removed and the heating means has been adjusted to its roasting or baking position;

Fig. 5 is a sectional view taken substantially on line 5—5 of Fig. 4 after an object of food has been placed in the oven for roasting or baking;

Fig. 6 is a fragmentary sectional view taken substantially on line 6—6 of Fig. 2;

Fig. 7 is a view similar to Fig. 3 showing the appliance modified slightly so as to be capable of functioning as a rotisserie in addition to performing its other cooking functions.

By reference to the drawings and particularly to Figs. 1 and 3, it will be observed that the improved, combination, electric, cooking appliance generally comprises a body which is formed by a plurality of walls which cooperate to define a cooking oven 10 and a mechanism compartment 12. These walls generally comprise top wall 14, bottom wall 16, front wall 18, rear wall 20, side walls 22 and 24, and an intermediate, vertically-disposed wall 26 which is spaced from and generally parallel to the side walls.

The oven 10 may be closed and had access to by the oven door 28, which is pivoted along its lower edge to the front of the bottom wall 16 in any conventional manner so as to be movable between its open position shown in Fig. 1 and its closed position shown in Figs. 2 and 5. In the latter position, it is temporarily secured by conventional latching means including the latches 30. The door 28 is provided with a transparent portion, such as the window 32, which affords observation of the object being cooked during cooking, and the handle 34, which is utilized to open or close the door.

Within the oven 10 there is disposed heating means in the form of a planar, heating shelf 36, the construction of which can best be seen in Figs. 5 and 6; the heating shelf comprises a metallic sheet 38 having an electrical resistance heating wire, which may be in the form of a bent, elongated, sheathed, heater tube 40, which is spaced from and secured to its lower side, as by securing clamps 42. As will become apparent subsequently, the heater tube is conventionally wired so as to afford selective energization, as by manipulation of the thermostat switch knob 74, which is mounted on front wall 18. Heating shelf 36 is pivotally mounted in the oven 10 on and between the walls 24 and 26 so as to be selectively disposed in either one of two positions. In Figs. 1 through 3 and 6, the heating shelf is illustrated as being disposed in a generally horizontal plane; in this position, it operates to broil objects placed beneath it on the broiler rack 44, which may be disposed at any desired distance from the heating shelf on the sets of broiling rack supports 46 and 48 formed on opposing sides of the walls 26 and 24, respectively.

When disposed in a generally horizontal plane, the heating shelf 36 may also function as a grill by placing objects of food on the top of the metallic sheet 38. In Fig. 3 the heating shelf 36 is illustrated in position to function to broil or grill food, and the steak S is illustrated as being disposed on the broiling rack 44 in a position to be broiled by the downwardly directed heat emitted by the heater tube 40 of the broiling shelf, and the egg E is illustrated as being disposed on the top of the heating shelf in position to be grilled by the hot metallic sheet 38. In order to facilitate grilling, a portion 45 of the top wall 14 may be hinged in a conventional manner to the remainder of the top wall so as to be pivotal upwardly to thereby expose the upper surface of the heating shelf during grilling (see Fig. 1).

The heating shelf 36 may also be selectively positioned so as to be disposed in a generally vertical plane; this position is shown in dot-dash lines in Fig. 2 and in Figs. 4 and 5. When the heating shelf 36 is disposed in a generally vertical plane, the appliance may be utilized to roast or bake objects placed in the oven 10, such as fowl F shown in a roasting pan in Fig. 5. When disposed in this position, the heating shelf 36 is parallel to and spaced from the rear wall 20 and cooperates therewith to effect a passage 50 which communicates with the remainder of the oven 10 (the portion of the oven other than passage 50) at one side through the space 52, and at the top and bottom through the spaces 54 and 56, respectively. It should be realized that the passageway and these spaces are only affected when the heating shelf 36 is in its vertical position.

The intermediate wall 26 has an elongated, vertically extending slot 58 formed therein which is disposed in said wall between the rear wall 20 and the heating shelf 36 when the latter is in vertical position; slot 58 places the passage 50 into communication with the mechanism chamber 12 (see Figs. 4 and 5). The intermediate wall 26 also includes a generally circular opening 60 which places the remainder of the oven 10 into communication with the mechanism chamber 12. Disposed in the mechanism chamber 12 is an air-flow producing unit 62 which comprises an electric motor 64 and a fan blade 66 which is disposed in close proximity to the opening 60. The motor 64 is conventionally and appropriately wired so as to be capable of being connected to a source of electricity, and a toggle switch 68 is provided on the front wall 18 which affords selective energization of the motor.

When roasting or baking is desired, the heating shelf 36 is disposed in its vertical position and energized by setting thermostat switch knob 74, and the toggle switch 68 is snapped to its "on" position to energize the motor 64 and thereby actuate the fan blade 66. This causes a flow of air through the appliance as indicated by the schematic arrows in Figs. 4 and 5. It will be noted that air is drawn from the oven 10 through the opening 60, through the mechanism compartment 12, out the elongated slot 58 into the passage 50, where it contacts the heating tube 40 of the heating shelf 36 and warms up, and then out the spaces 52, 54 and 56 into the remainder of the oven 10. The effect is such as to provide a constant flow of forced warm air over the object of food being roasted or baked to effectively and efficiently cook the object.

It will be understood that regardless of whether the heating shelf 36 is in its horizontal or vertical position, its heating tube 40 may be energized in a conventional manner by electricity which is supplied by appropriate and conventional wiring, which may include the terminal block 70 and electrical wire 72 (see Fig. 6). In any event, included in the electrical wiring there may be provided a thermostatic switch having the referred-to knob 74 (see Fig. 1), which may function in a conventional manner to control energization of the heating tube 40 either to provide a constant source of heat for broiling or grilling, or to provide a pre-selected, substantially constant, desired temperature in the appliance for baking or roasting. The specific details of the electrical wiring, thermostatic switch and toggle switch for controlling the energization of the fan blade motor form no specific part of this invention and, therefore, will not be described in detail.

Means is provided in the appliance for enabling the heating shelf 36 to be manually and selectively disposed in either its two positions, viz., its horizontal or vertical position. It will be understood that numerous alternative physical constructions could be readily devised for this purpose, and that only one exemplary arrangement is illustrated and will be described. The illustrated arrangement is effected by pivoting the heating shelf 36 at its rearward side to the intermediate wall 26 and the side wall 24 (see particularly Figs. 1, 3 and 6). A rod 76 is rigidly connected to the metallic sheet 38 at its rearward edge, and has a portion extending through and beyond the bent side edge of the metallic sheet at each side. Portion 78 (see Fig. 6) extends at one side through bent side edge 98 and is slidably received in and extends through the opening 80 formed in the intermediate wall 26. An enlarged stop 82 is rigidly secured to the free end of the rod portion 78. Portion 84 extends at the other side through bent side edge 90 and is slidably received in and extends through the opening 86 formed in the wall 24. The free end of the portion 84 is accessible from the exterior of the appliance and rigidly supports a manually grippable knob 88. Between the inner face of the side wall 24 and the bent side edge 90 of the metallic sheet 38 is disposed a compressible, coil spring 92. Toward the forward upper side of the intermediate wall 26 there is formed a locating opening 94 (see Figs. 1, 5 and 6). Secured to the bent side edge 98 of the metallic sheet 38 at its forward end (the end which is opposite to that through which the portion 78 extends) is a rigidly secured, projecting pin 100. Pin 100 is shorter than the rod portion 78. Disposed in the intermediate vertical wall 26 is formed another locating opening 102, which is near the bottom of the elongated slot 58 (see Figs. 1 and 2).

The entire arrangement is such that the heating shelf 36 may be selectively adjusted from one position to the other by gripping the knob 88 and pulling it away from the side wall 24 to laterally shift the heating shelf relative to the appliance, and then turning the knob 88 so as to pivot the heating shelf on an axis passing through the rod 76. It will be understood that normally the coil spring 92 urges the heating shelf to the left as shown in Figs. 3, 4 and 6, and that the heating shelf is firmly positioned in one of its positions by the rod portions 78 and 84 which are always located in openings 82 and 86, respectively, and pin 100 which is located in either locating opening 94 or 102, depending on the position of the heating shelf. Moving the heating shelf away from the side wall 24 laterally to the right has the effect of compressing the spring and withdrawing pin 100 out of the opening in which it was located. In Fig. 6, the dotted lines show the heating shelf in horizontal position with the pin 100 in the opening 94, and the solid lines show the shelf moved to the right, the spring compressed and the pin 100 clear of the locating opening. When the spring is compressed and the pin 100 withdrawn out of its locating opening, the heating shelf may be pivoted, and the pin 100 may be juxtaposed to either of the locating openings 94 or 102. Release of the knob 88 allows the spring 92 to force the heating shelf to the left, thereby causing the pin 100 to enter the locating opening which it is adjacent to. It will be readily understood that withdrawal of the pin 100 out of its locating openings is permitted because of the length of the pin; in other words, the pin is short enough to be free of its locating openings when the heating shelf is moved to the right (solid lines in Fig. 6) and, yet it is long enough to enter a locating opening when the heating shelf is released (dotted line position in Fig. 6).

In view of the foregoing, it will be apparent that a combination, electric, cooking appliance has been provided which is capable of broiling or grilling when the heating shelf is disposed in its horizontal position and the heating tube energized for broiling or grilling, and wherein the appliance may be utilized to roast or bake with forced, warm air when the heating shelf is disposed in its vertical position, the heater tube energized for any pre-selected oven temperature, and the fan blade motor energized; further, that an arrangement has been provided in such an appliance for readily adjusting the heating shelf from one position to the other.

If it is desired to utilize the improved, combination, cooking appliance as a rotisserie, in addition to a broiler, grill, roaster or baker, the appliance described thus far may be modified slightly (as shown in Fig. 7) to effect this additional, desired function. All that it is necessary to do to the Figs. 1–6 construction, is to provide the gearing designated generally as 104 in Fig. 7, which comprises a plurality of gears and supporting axles which are operatively connected to a driving gear 106 which is provided on the fan blade motor shaft. It will be noted that components of the Fig. 7 modification which are common to those of the Figs. 1 through 6 construction are designated by similar reference numerals with the addition of a prime. The gearing 104 is designed in any known manner to effect a reduction in speed of the fan blade motor shaft such that the gear 108, which is part of gearing 104 and is rotatably mounted in opening 110 in the intermediate vertical wall 26', rotates at a relatively slow speed.

The gear 108 has a non-circular socket 112 formed therein which is adapted to detachably receive a complementary shaped end 114 of a rotisserie spit 116, when the latter is mounted in the appliance, to effect a driving connection between the fan blade motor and the spit. The side wall 24 is provided with a conventional slot 118 through which a portion 120 of the spit may be slid to a point where it is aligned with socket 112. A pair of flanges 122 are rigidly formed on the spit and located to straddle the portions of the side wall 24 that are adjacent to the slot 118. Spit 116 may be mounted in the appliance by opening the oven door and connecting its end 114 in the socket 112 and sliding its portion 120 through slot 118.

When the toggle switch is snapped on to the "on" position, and the spit is mounted as illustrated in Fig. 7, the fan blade motor will drive the spit at a slow speed. It will be apparent that the motor will also drive the fan blade 66'. If it is desired to eliminate the flow of air which is caused by the fan blade 66', the appliance may be provided with a manually-operated coupling which will allow uncoupling of the fan blade from the fan blade motor shaft when only rotation of the rotisserie spit is desired. Similarly, if it is desired not to drive the gearing 104 when the device is utilized without the rotisserie spit 116, a manually-operated coupling may be provided for uncoupling the gearing from the fan blade motor shaft. If it is desired to eliminate the gearing entirely, a two-speed fan blade motor may be utilized and appropriate power transmission means provided between the motor and the spit.

It should be realized that regardless of the detailed components incorporated, the Fig. 7 modification of the invention contemplates the utilization of a single electric motor to selectively drive either or both the fan blade 66' and the rotisserie spit 116 in association with the Figs. 1–6 type of construction to thereby render the latter capable of functioning as a rotisserie when it is set for broiling operation and the spit is driven. The desirability of having such a dual purpose motor is believed to be apparent.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A cooking appliance comprising walls defining an oven, planar heating means mounted in said oven and adapted to assume either a substantially horizontal position or a substantially vertical position, said heating means adapted to cooperate with one of said walls when it is in its substantially vertical position to define a passageway, and means for causing a flow of air through said passageway, over said heating means and through said oven when the heating means is in its vertical position, whereby said appliance is adapted to function as a grill or broiler when said heating means is mounted in its substantially horizontal position, and said appliance is adapted to function as a roaster or baker when said heating means is mounted in its substantially vertical position and said air flow causing means is actuated.

2. A device as defined in claim 1 wherein a rotisserie spit is adapted to be mounted for rotation in said oven, and said air flow causing means is adapted to rotate said rotisserie spit, whereby said appliance is adapted to function as a rotisserie when said heating means is mounted in its substantially horizontal position and the spit is rotated.

3. A device as defined in claim 1 wherein said heating means comprises a shelf having an electrical heating wire disposed on one side, and said shelf is located in said oven so that when it is in its substantially horizontal position, said heating wire faces downwardly, whereby objects of food may be placed on the upper surface of said shelf for grilling or underneath said shelf for broiling.

4. A cooking appliance comprising a plurality of walls defining an oven and a chamber, one of said walls separating said oven and said chamber, planar heating means mounted in said oven and adapted to assume either a substantially horizontal position or a substantially vertical position, said heating means adapted to cooperate with one of said walls when it is in its substantially vertical position to define a passageway, two openings in said separating wall, one of said openings being disposed adjacent to said passageway and placing the latter into communication with said chamber, the other of said openings disposed at a point remote from said one of said openings and placing the portion of said oven other than said passageway into communication with said chamber, and means for causing a flow of air through said oven portion, said other of said openings, said chamber, said one of said openings, and said passageway when said heating means is in its substantially vertical position, whereby said appliance is adapted to function as a broiler or grill when said heating means is mounted in its substantially horizontal position, and said appliance is adapted to function as a roaster or baker when said heating means is mounted in its substantially vertical position and said air flow causing means is actuated.

5. A device as defined in claim 4 wherein said heating means comprises a shelf having an electrical heating wire disposed on one side, and said shelf is mounted so that when it is in its vertical position, said heating wire is disposed in said passageway, whereby air passing through said passageway is warmed as it passes over said heating wire.

6. A device as defined in claim 4 wherein said heating means comprises a shelf having an electrical heating wire on one side, said shelf being mounted so that when it is in its horizontal position, said heating wire is below said shelf, whereby objects of food may be placed on the upper surface of said shelf for grilling or underneath said shelf for broiling.

7. A device as defined in claim 4 wherein said air flow causing means comprises a motor driven fan blade which is disposed adjacent to said other of said openings.

8. A device as defined in claim 7 wherein a rotisserie spit is adapted to be mounted for rotation in said oven, and the motor for driving said fan blade is adapted to rotate said rotisserie spit, whereby said appliance is adapted to function as a rotisserie when it is set for broiling and said spit is rotated.

9. A device as defined in claim 8 wherein said separating wall rotatably supports a gear which includes a socket that is adapted to receive an end of said spit, said gear being driven by said fan blade motor through speed reduction gearing.

10. A device as defined in claim 4 wherein said heating means is pivotally mounted between its horizontal and vertical positions and means is provided for moving said heating means to either of its positions and retaining it therein.

11. A cooking appliance comprising an oven, planar heating means pivotally mounted on an axis that passes near an edge thereof in said oven and adapted to assume either a substantially horizontal position or a substantially vertical position, said heating means being adapted to cooperate with said oven when in one of said positions to form a passageway, means for pivoting said heating means to either of said positions and retaining it therein, and means for causing a flow of air through said passageway, over said heating means and through said oven when said heating means is in said one of its positions, whereby said appliance is adapted to function as a roaster or baker when said heating means is mounted in said one of its positions and said air flow causing means is actuated, and said appliance is adapted to function as a broiler when said heating means is mounted in the other of its positions.

References Cited in the file of this patent

UNITED STATES PATENTS

| | | |
|---|---|---|
| 1,218,341 | Truitt | Mar. 6, 1917 |
| 1,878,258 | Bemis | Sept. 20, 1932 |
| 2,214,630 | Wheeler | Sept. 10, 1940 |
| 2,417,977 | French | Mar. 25, 1947 |
| 2,478,253 | Doner | Aug. 9, 1949 |
| 2,502,685 | Warner | Apr. 4, 1950 |
| 2,523,796 | Weeks | Sept. 26, 1950 |

FOREIGN PATENTS

| | | |
|---|---|---|
| 118,423 | Great Britain | Sept. 5, 1918 |
| 1,007,319 | France | Feb. 6, 1952 |